(12) United States Patent
Lalancette et al.

(10) Patent No.: US 8,998,790 B2
(45) Date of Patent: Apr. 7, 2015

(54) METHOD AND COMPOSITION FOR SEQUESTRATION OF ARSENIC

(71) Applicant: Dundee, Technologies Durables Inc., Montreal (CA)

(72) Inventors: Jean-Marc Lalancette, Sherbrooke (CA); Bertrand Dubreuil, Trois-Rivières (CA); David Lemieux, Thetford Mines (CA)

(73) Assignee: Dundee, Technologies Durables Inc. (CA)

( * ) Notice: Subject to any disclaimer, the term of this patent is extended or adjusted under 35 U.S.C. 154(b) by 0 days.

(21) Appl. No.: 14/017,578

(22) Filed: Sep. 4, 2013

(65) Prior Publication Data

US 2014/0107389 A1 Apr. 17, 2014

Related U.S. Application Data

(60) Provisional application No. 61/714,424, filed on Oct. 16, 2012.

(51) Int. Cl.
| | |
|---|---|
| *B09B 1/00* | (2006.01) |
| *B09B 3/00* | (2006.01) |
| *C03C 3/087* | (2006.01) |

(52) U.S. Cl.
CPC .............. *B09B 3/0025* (2013.01); *C03C 3/087* (2013.01)

(58) Field of Classification Search
USPC ........................................................ 588/256
See application file for complete search history.

(56) References Cited

U.S. PATENT DOCUMENTS

| | | | | |
|---|---|---|---|---|
| 1,956,176 | A * | 4/1934 | Parkinson ........................ | 501/57 |
| 4,898,692 | A * | 2/1990 | Rajan et al. ..................... | 588/11 |
| 5,769,961 | A | 6/1998 | Peters et al. | |
| 7,216,510 | B2 * | 5/2007 | Doehring et al. ............... | 65/107 |
| 2004/0007536 | A1 | 1/2004 | Videla et al. | |
| 2009/0071296 | A1 | 3/2009 | Hillier et al. | |
| 2009/0113937 | A1* | 5/2009 | Carleer et al. .................... | 65/95 |
| 2010/0044631 | A1 | 2/2010 | Fujita et al. | |

FOREIGN PATENT DOCUMENTS

| | | | |
|---|---|---|---|
| CN | 102965517 | A | 3/2013 |
| JP | 2001-287930 | * | 10/2001 |
| WO | WO-02/094381 | A1 | 11/2002 |
| WO | WO-2010/088513 | A2 | 8/2010 |
| WO | WO-2012/091745 | A1 | 7/2012 |

OTHER PUBLICATIONS

"EPA: Arsenic Treatment Technologies for Soil, Waste and Water; EPA-542-R-02-004; 5-1 to 5-8 (Sep. 2002)", 10 pgs.
"EPA: Method 1312; Synthetic Precipitation Leaching Procedure (Sep. 1994)", 28 pgs.
Kartinen, Ernest O., et al., "An overview of arsenic removal processes", Elsevier; Desalination 103; 79-88 (1995), 79-88.
Magalhaes, M.C.F., "Arsenic. An environmental problem limited by solubility", Pure Appl. Chem.; vol. 74, No. 10, 1843-1850 (2002), 1843-1850.
Oscarson, D. W., et al., "Role of manganese in the oxidation of arsenite by freshwater lake sediments", Clay and Clay Minerals, vol. 29, No. 3, 219-225 (1981), 219-225.
Papassiopi, Nimfodora, et al., "Removal and fixation of arsenic in the form of ferric arsenates. Three parallel experimental studies", Elsevier; Hydrometallurgy 41; 243-253 (1996), 243-253.
"International Application Serial No. PCT/CA2013/050664, International Search Report mailed Nov. 4, 2013", 6 pgs.
"International Application Serial No. PCT/CA2013/050664, Written Opinion mailed Nov. 4, 2013", 6 pgs.
"Machine Transaction of CN 102965517A, published Mar. 3, 2013", 5 pgs.
Bissen, M., et al., "Arsenic—a Review. Part II: Oxidation of Arsenic and its Removal in Water Treatment", *Acta Hydrochim, et Hydrobiol.*, 31(2), (2003), 97-107.
Feng, X.-H., et al., "Arsenite oxidation by three types of manganese oxides", *Journal of Environmental Sciences*, 18(2), (2006), 292-298.
Machingawuta, N. C., et al., "Incorporation of arsenic in silicate slags as a disposal option", *Trans. Instn. Min. Metall. (Sect. C): Mineral Process. Extr. Metall.*, 103, (1994), C1-C8.
Mehta, A. K., "Investigation of New Techniques for Control of Smelter Arsenic Bearing Wastes", EPA-600/S2-81-049, United States Environmental Protection Agency, Research and Development, (Sep. 1981), 1-6.
Oscarson, D. W., et al., "Kinetics of Oxidation of Arsenite by Various Manganese Dioxide", *Soil Science Society of America Journal*, 47, (1983), 644-648.
Twidwell, L. G., "Safe Disposal of Arsenic Bearing Flue Dust by Dissolution in Smelter Slags", *Journal of Hazardous Materials*, 8, (1983), 85-90.

* cited by examiner

*Primary Examiner* — John Kreck
(74) *Attorney, Agent, or Firm* — Schwegman Lundberg & Woessner, P.A.

(57) ABSTRACT

A method for sequestrating arsenic oxides, comprising forming an insoluble and stable glass incorporating a fully oxidized form of arsenic generated by oxidation of an initial lower oxide of arsenic and stabilization by calcium salt formation. The glass composition for sequestration of arsenic comprises from 50 to 75% silica; from 0.5 to 3% $Al_2O_3$; from 1 to 15% MnO; from 5 to 15% CaO; from 1 to 20% $As_2O_5$ and from 8 to 14% $Na_2O$, less than four percent of iron oxides, magnesium oxide and other oxides.

13 Claims, No Drawings

METHOD AND COMPOSITION FOR SEQUESTRATION OF ARSENIC

CROSS REFERENCE TO RELATED APPLICATIONS

This application claims benefit of U.S. provisional application Ser. No. 61/714,424, filed on Oct. 16, 2012. All documents above are incorporated herein in their entirety by reference.

FIELD OF THE INVENTION

The present invention relates to a method and a composition for sequestration of arsenic oxides.

BACKGROUND OF THE INVENTION

The smelting of concentrates of copper, zinc, lead, nickel, cobalt, silver or gold is accompanied by the volatilization of arsenic that is very often a minor but significant component of sulfide concentrate. This volatilized arsenic, under the form of arsenious oxide ($As_2O_3$), is condensed and collected by various approaches, such as electrostatic precipitation, wet scrubbing or filtration through bag houses. The volume of arsenic thus produced far exceeds the market demands, and most of it has to be disposed of in a safe manner.

One technique largely used is the formation of ferric arsenate (scorodite: $FeAsO_4.2H_2O$) from the arsenious oxide. A solution of $As_2O_3$ in water is oxidized to $As_2O_5$ with an oxidizing agent such as chlorine or hydrogen peroxide, and this solution is contacted with a ferric salt at a proper pH, with a large excess of iron, up to eight moles of iron per mole of arsenic (N. Papassiopi et al., Hydrometallurgy 41, 243-253 (1996)). Under these conditions, very low solubilities of arsenic are observed, but the presence of other ions, particularly sulfates, can interfere with these results. Large iron consumption, along with the use of expensive reagents ($Cl_2$, $H_2O_2$), and delicate operational conditions, make this technique costly.

Other approaches have been used to remove arsenious oxide from solutions, either precipitation, membrane and adsorption (E. O. Kartinen et al., Desalination 103 19-88 (1995)). In all cases, the results were significantly below performances reported for the scorodite method.

In order to obtain a sequestration of arsenic that would be more permanent than scorodite, several attempts of vitrification of arsenic have been reported (Arsenic Treatment Technologies for Soil, Waste and Water: EPA-542-R-02-004, September 2002, 5-1 to 5-8). These approaches go from arc heating of the arsenic-bearing materials in the soil to treatment of particulates loaded with arsenic in process effluents. In all cases, the arsenic content was at most 3 percent of the mass treated, the low solubility of arsenious oxide in silica glass being the limiting factor. It was noted that this approach suffered from several limitations, such as important volatilization of the arsenic in the process, interference of anion such as chlorides, fluorides and sulfates with the quality of the glass, glass solubility and toxic volatiles formation, such as dioxins.

The present description refers to a number of documents, the content of which is herein incorporated by reference in their entirety.

SUMMARY OF THE INVENTION

More specifically, in accordance with the present invention, there is provided a method for sequestrating arsenic oxides, comprising forming an insoluble and stable glass incorporating a fully oxidized form of arsenic generated by oxidation of an initial lower oxide of arsenic and stabilization by calcium salt formation.

There is provided a method for sequestrating arsenic oxides, comprising forming an insoluble and stable glass having a composition by weight of from 50 to 75% silica; from 0.5 to 3% alumina; from 1 to 15% manganese oxide; from 5 to 15% calcium oxide; from 1 to 20% arsenic calculated as arsenic oxide and from 8 to 14% of sodium oxide, and less than four percent of iron oxides, magnesium oxide and other oxides.

There is further provided a glass composition, comprising from 50 to 75% silica; from 0.5 to 3% $Al_2O_3$; from 1 to 15% MnO; from 5 to 15% CaO; from 1 to 20% $As_2O_5$ and from 8 to 14% $Na_2O$, less than four percent of iron oxides, magnesium oxide and other oxides.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

The recovery of metallic values from sulfide ores of Cu, Zn, Pb, Ni, Co, Ag and Au very generally calls for the oxidation or roasting of the sulfide material in the course of the smelting operation. In most circumstances, the starting sulphide is previously enriched by a flotation process, and the initial traces of arsenic, which can be as low as 10 ppm in the ore, and may then reach 20% in the concentrate. By oxidation, this arsenic, in large part, is transformed into arsenious oxide ($As_2O_3$) and volatilized at the temperatures used for roasting or smelting. Thus a complex stream of gases incorporating arsenious oxide $As_2O_3$ and other undesirable species and solid particulates have to be treated in order to separate the contaminants from the sulfur dioxide stream by a variety of physical methods such as electrostatic precipitation or filtration through bag houses. The raw arsenious oxide $As_2O_3$ containing other pollutants has to be disposed of in a fashion compatible with environmental regulations.

The present invention considers disposal of arsenic by formation of an insoluble glass incorporating this material.

Previous reports on glass formation have indicated the difficulties of forming a glass at temperatures above 1000° C. with materials that are volatile above 300° C., such as arsenious oxide $As_2O_3$, or thermally unstable above 750° C., such as arsenic oxide $As_2O_5$.

When arsenic oxide $As_2O_5$ is combined with calcium hydroxide ($Ca(OH)_2$), then the resulting calcium arsenate $Ca_3(AsO_4)_2$ is thermally stable up to 1455° C., i.e. up to a temperature allowing glass formation. However, the oxidation of arsenious oxide $As_2O_3$ to arsenic oxide $As_2O_5$ calls for costly oxidizers ($Cl_2$, $H_2O_2$ or $O_2$ under pressure), and the formation of calcium arsenate $Ca_3(AsO_4)_2$ still represents an additional elaborate step.

In an experiment using manganese dioxide $MnO_2$ as the oxidizing agent of arsenious oxide $As_2O_3$ in the presence of calcium hydroxide $Ca(OH)_2$, manganese dioxide $MnO_2$ and calcium hydroxide $Ca(OH)_2$ were introduced into a mixture of arsenious oxide $As_2O_3$ and glass-forming components, i.e. silica $SiO_2$, sodium oxide $Na_2O$, calcium oxide CaO, alumina $Al_2O_3$, aluminosilicates of potassium, sodium, calcium (feldspar), sodium carbonate $Na_2CO_3$, before thermal treatment. Surprisingly, there was no significant volatilization of arsenic when the calcium arsenate $Ca_3(AsO_4)_2$ was prepared in a water slurry below 100° C., and a clear homogenous glass was obtained. The overall reaction describing the stabilizing of arsenic and glass formation is given by the flowing relation:

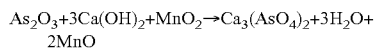

Elemental analysis confirmed the fixation of more than 95% of the initial amount of arsenic in the thus formed glass.

The source of manganese dioxide $MnO_2$ was pyrolusite, a low-cost mineral containing 40 to 80% manganese dioxide $MnO_2$, the other components of this ore being aluminosilicates, iron oxides and titanium oxide. It appears that the presence of these other components, along with the manganous oxide MnO resulting from the oxidation of the arsenic, does not interfere with the glass formation but has to be taken into account in the overall formulation of the glass. This formulation was done within the following limits by weight: from 50 to 75% silica $SiO_2$; from 0.5 to 3% alumina $Al_2O_3$; from 1 to 15% manganese oxide MnO; from 5 to 15% calcium oxide CaO; from 1 to 20% arsenic oxide $As_2O_5$ and from 8 to 14% of sodium oxide $Na_2O$, along with less than four percent of iron oxides, magnesium oxide and other oxides known to volatilize with arsenious oxide $As_2O_3$.

Using this approach, up to 20% by weight of arsenic oxide $As_2O_5$ could be incorporated in the glass structure and still yield a homogeneous, transparent and insoluble glass, without significant arsenic volatilization at the glass formation stage. The arsenic release from the glass was measured by the standard leaching procedure in acidic solution for several hours (EPA Method 1312 "Synthetic Precipitation Leaching Procedure" Sept. 1994). Values well below the norm were observed.

A starting load of raw arsenious oxide $As_2O_3$, pyrolusite, calcium hydroxide $Ca(OH)_2$ and other glass-forming components, or recycled glass as will be described hereinbelow, were intimately mixed before heating in a crucible. This operation can be achieved by standard approaches, such as sieving through a mesh smaller than 60 or by using ball milling or high speed rotating equipment.

It was found that by using recycled glass, the $SiO_2/Na_2O/CaO$ components of the glass-forming mixture could be obtained at a very low price. The use of recycled glass greatly facilitated the formation of a new glass incorporating arsenic when compared to the formation of fresh glass from silica $SiO_2$, feldspar, sodium carbonate $Na_2CO_3$ and calcium hydroxide $Ca(OH)_2$ for example.

After the stabilization of arsenic oxide $As_2O_5$ by oxidation of arsenious oxide $As_2O_3$ and combination with calcium hydroxide $Ca(OH)_2$, the heating cycle was started at room temperature, and the temperature was increased at a constant rate to 1000° C. over a period of one hour. After a plateau at a temperature in a range between 1000° C. and 1200° C. for fifteen minutes, the charge was allowed to cool in a crucible, or poured into a mold.

The arsenic thus integrated in the glass is isolated from the environment for a period of geological time scale due to glass insolubility and enormous surface exposure reduction resulting from glass formation, provided the glass is not heated up to 1455° C.

The present invention will now be illustrated by the following examples.

EXAMPLE 1

Incorporation of Arsenic Oxide $As_2O_5$ in a Synthetic Glass

A 10 g solution of arsenious oxide $As_2O_3$ in one liter of water was oxidized with oxygen in an autoclave at 100° C. and 200 psi for two hours. The resulting arsenic oxide $As_2O_5$ solution was evaporated and the residual solid (11.5 g) was incorporated in a mixture made of 14.7 g of calcium oxide CaO, 35.9 g of silica $SiO_2$ and 49.4 g of iron(II) oxide FeO. This mixture was made homogeneous by shaking in a bag, screening on a 60 mesh screen and again mixing in a bag. The ratio of calcium oxide CaO, silica $SiO_2$ and iron(II) oxide FeO corresponds to an olivine with a melting point of 1093° C. This mixture incorporating the components of olivine with the arsenic oxide $As_2O_5$ was then heated in an induction furnace from room temperature to 1250° C. over a period of one hour followed by a plateau at 1250° C. for 15 minutes. White fumes were observed during the heating period, suggesting a volatilization of arsenic. The elemental analysis of the resulting glass (105.7 g) indicated that 55% of the arsenic in the initial glass-making mixture had been volatilized during the melting operation.

EXAMPLE 2

Incorporation of Arsenic ($As_2O_3$) in a Glass via the Simultaneous Oxidation of Arsenious Oxide $As_2O_3$ and Formation of Calcium Arsenate $Ca_3(AsO_4)_2$ An homogeneous mixture of 4.95 g of arsenious oxide $As_2O_3$ (3.734 g of As), 6.67 g of calcium hydroxide $Ca(OH)_2$, 7.24 g of pyrolusite (70% $MnO_2$) and 50.0 g of recycled glass was prepared by mixing in a bag, screening on a 60 mesh screen and mixing again in a bag. This mixture (68.86 g) was then contacted with 200 ml of water at 100° C. for one hour, filtered and dried. The arsenic in the filtrate (0.64 ppm) indicated that 99.14% of the initial arsenious oxide $As_2O_3$ had been transformed into insoluble calcium arsenate $Ca_3(AsO_4)_2$. The dried mixture (67.56 g) was then heated up to 1250° C. in a refractory crucible over a period of one hour, followed by a plateau of 15 minutes at 1250° C. No white fumes were observed during the heating, and the weight of the resulting dark green glass thus formed was 64.74 g. Elemental analysis indicated that 98.8% of the initial arsenic was incorporated into the glass structure, which had a 8.3% content of arsenic expressed as arsenic oxide $As_2O_5$.

EXAMPLE 3

Preparation of a Glass from a Glass-Forming Mixture Incorporating 20% Arsenic Calculated as Arsenic Oxide $As_2O_5$ The procedure followed was similar to that of Example 2, the starting mixture being made with 24.73 g of arsenious oxide $As_2O_3$, 33.41 g of calcium hydroxide $Ca(OH)_2$, 36.21 g of pyrolusite (70% $MnO_2$) and 50.0 g of recycled glass. After the mixing and formation of calcium arsenate $Ca_3(AsO_4)_2$ with a yield of 99.60%, the dry mixture was heated at 1250° C., giving 129.54 g of a dark glass with an arsenic content of 13.8%, corresponding to 20% arsenic as arsenic oxide $As_2O_5$. This indicated retention of 95.44% of the initial amount of arsenic in the glass. Standard leaching test on this glass following EPA procedure indicated a leaching of 3.26 ppm of arsenic, well below the norm of 5 ppm.

EXAMPLE 4

Production of a Glass Incorporating 17% of $As_2O_5$

A dry mixture of 19.78 g of $As_2O_3$, 26.74 g of $Ca(OH)_2$, 28.97 g of pyrolusite and 60.0 g of recycled glass was prepared by screening over a 60 mesh sieve followed by shaking in a bag. The $As_2O_3$ and $Ca(OH)_2$ were analytical grade products. The pyrolusite was an untreated naturally occurring material showing 70% $MnO_2$ at the analysis. The recycled glass was showing the following elemental composition: Fe: 021%; Mg: 0.68%; Mn: 0.02%; Ca: 7.58%; Pb: 0.02%; Si: 35.2%; Al: 1.0%; Na: 9.35%; K: 0.5%; Ti: 0.03%; B: 0.03%; As: not detected.

The homogeneous dry mixture was then suspended in 400 ml of water and the resulting slurry stirred at 90° C. for one hour. The slurry was filtered and dried to give 134.5 g of a mixture of calcium arsenate, manganous oxide, recycled glass and other oxides from the pyrolusite and reagents in excess. The filtered solution was containing 0.05 g/l of arsenic, indicating the near quantitative (99.6%) transformation of the initial arsenious oxide into the insoluble calcium arsenate.

The dried mixture was heated in a refractory crucible to a temperature of 1250° C. over a period of one hour. Elemental analysis indicated that 98.8% of the initial arsenious oxide was found in the resulting glass, after fusion. The glass thus obtained was black and homogenous. Lixiviation tests have shown very light leaching at 0.6 mg/l of arsenic, well below the 5.0 mg/l norm formulated by EPA. This initial level of leaching (18 hours) did not increase after one month, confirming the very efficient encapsulation of the arsenic in the glass structure.

There is thus provided a method for sequestration of arsenic in a glass composition and a glass composition therefor. The initial arsenic material is arsenious oxide $As_2O_3$. In order to be incorporated in a glass, arsenious oxide $As_2O_3$, which sublimes at 300° C., is transformed into the less volatile arsenic oxide $As_2O_5$ by oxidation. Otherwise, at glass formation temperature, most arsenious oxide $As_2O_3$ volatilizes. Even arsenic oxide $As_2O_5$ has to be modified to be incorporated in a glass, because arsenic oxide $As_2O_5$ loses oxygen at 750° C. and is then volatilized as arsenious oxide $As_2O_3$. However, when transformed into arsenic oxide $As_2O_5$ and combined with calcium oxide CaO or hydroxide Ca$(OH)_2$, the resulting arsenical material is thermally stable up to 1455° C., thus allowing glass formation without volatilization. Therefore, two steps are required to prevent volatilization of arsenic during glass formation, namely, oxidation of As to pentavalent state $As_2O_5$ and subsequent combination with calcium hydroxide $Ca(OH)_2$ or oxide CaO.

Standard oxidizing agents, such as chlorine, hydrogen peroxide, or oxygen under high pressure, can be used for oxidation of arsenious oxide $As_2O_3$ into arsenic oxide $As_2O_5$.

Surprisingly, it was found that these operations of oxidation and calcium salt formation could be combined with glass production using, as the oxidizing agent, manganese dioxide $MnO_2$ agent found in a common ore, pyrolusite for example. If components of a desired glass are mixed intimately and heated up gradually, first as a water slurry to 100° C. and then as a dry mixture to the required glass-forming temperature, the following equations describes the evolution of arsenic:

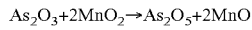

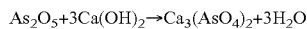

In a water slurry and at a temperature in a range between 50 and 100° C., the manganese dioxide $MnO_2$ oxidizes the arsenic trivalent oxide, arsenious oxide $As_2O_3$ to the pentavalent arsenic oxide, arsenic oxide $As_2O_5$. The arsenious oxide $As_2O_3$ is oxidized to the less volatile arsenic oxide $As_2O_5$ before the temperature of volatilization of the arsenious oxide $As_2O_3$ is reached. The calcium CaO or hydroxide $Ca(OH)_2$ is then combined with the arsenic oxide $As_2O_5$ to give the calcium arsenate $Ca_3(AsO_4)_2$, which is thermally stable up to 1455° C. Thus, temperatures required for glass forming, above 1000° C., can be obtained using a very cheap oxidizing agent, manganese dioxide $MnO_2$, without significant volatilization problems. The end products, manganous oxide MnO and calcium arsenates $Ca_3(AsO_4)_2$, can be easily incorporated into the glass structure.

The formation of a glass is obtained when an initial mixture of arsenious oxide $As_2O_3$, calcium CaO or hydroxide $Ca(OH)_2$ and manganese dioxide $MnO_2$ is incorporated with glass-forming elements, i.e. either silica $SiO_2$, sodium carbonate $Na_2CO_3$ and a small amount of a flux such as sodium borax for example, or recycled glass. Also, some calcium or magnesium oxides, for example between 5 and 15% CaO, allow rendering the glass completely insoluble.

Thus, the formation of a homogeneous glass at temperatures between 1100° C. and 1200° C. was experimentally observed. It was also found that it was much simpler and more economical to substitute recycled glass to fresh silica/sodium carbonate/calcium or magnesium oxide components for the glass formation.

Secondary elements in pyrolusite, such as aluminosilicates, iron oxides, titanium oxide, or contaminants in the arsenious oxide $As_2O_3$ such as ore particulates, do not prevent the formation of homogeneous and insoluble glass if proper ratio of the main components of the glass, namely, silica, calcium/magnesium oxide, sodium oxide and arsenic oxide are maintained within proper limits or ratio.

Leaching tests under standard conditions proved the very permanent sequestration of arsenic within the glass mass, which can be disposed of in a massive state without environmental restrictions.

As people in the art will appreciate, there is provided a method for encapsulating high concentrations of arsenious oxide without significant volatilization of toxic components, yielding sequestration of arsenic in the glass structure, the glass being truly insoluble and obtained at low cost, thereby preventing its release in the environment.

The scope of the claims should not be limited by the preferred embodiments set forth in the examples, but should be given the broadest interpretation consistent with the description as a whole.

REFERENCES

N. Papassiopi et al., Hydrometallurgy 41, 243-253 (1996)).
E. O. Kartinen et al., Desalination 103 19-88 (1995)
Arsenic Treatment Technologies for Soil, Waste and Water: EPA-542-R-02-004, September 2002, 5-1 to 5-8
EPA Method 1312 "Synthetic Precipitation Leaching Procedure" Sept. 1994

The invention claimed is:
1. A method for sequestrating arsenic oxides, comprising forming an insoluble and stable glass by mixing an initial lower oxide of arsenic with one of: i) glass-forming elements and ii) recycled glass; adding an oxidizing agent, for oxidizing the initial lower oxide of arsenic into a fully oxidized form of arsenic, and at least one of: i) calcium oxide and ii) calcium hydroxide for stabilization of arsenic by calcium salt formation; and a heating cycle.
2. The method of claim 1, wherein the initial lower oxide of arsenic is arsenious oxide, and the fully oxidized form of arsenic is pentavalent arsenic oxide.

3. The method of claim 1, wherein the oxidizing a ent is manganese dioxide.

4. The method of claim 1, wherein said adding the oxidizing agent comprises adding manganese dioxide, in a water slurry and at a temperature in a range between 50° C. and 100° C.

5. The method of claim 1, wherein the oxidizing agent is pyrolusite.

6. The method of claim 1, comprising mixing the initial lower oxide of arsenic with glass-forming elements selected in the group consisting of silica, sodium oxide, calcium oxide, alumina, feldspar, sodium carbonate and magnesium oxide.

7. The method of claim 1, wherein the initial lower oxide of arsenic is arsenious oxide, the oxidizing agent oxidizing the arsenious oxide into arsenic oxide, and the arsenic oxide being thermally stabilized by the at least one of: calcium oxide and calcium hydroxide.

8. The method of claim 1, wherein said heating cycle comprises increasing the temperature to a range between about 1000° C. and about 1200° C., maintaining the temperature within the range between about 1000° C. and about 1200° C. to allow glass formation, and cooling.

9. A method for sequestrating arsenic oxides, comprising forming an insoluble and stable glass having a composition by weight of from 50 to 75% silica; from 0.5 to 3% alumina; from 1 to 15% manganese oxide; from 5 to 15% calcium oxide; from 1 to 20% arsenic calculated as arsenic oxide and from 8 to 14% of sodium oxide, and less than four percent of iron oxides, magnesium oxide and other oxides.

10. The method of claim 9, wherein said forming the insoluble and stable glass is done at a temperature comprised between 1000° C. and 1200° C.

11. The method of claim 9, comprising reducing glass-forming elements to a very fine state smaller than 60 mesh and intimately mixing them with arsenious oxide, manganese dioxide and calcium hydroxide, and starting a heating cycle.

12. The method of claim 9, comprising using recycled glass reduced to a very fine state smaller than 60 mesh.

13. A glass composition, comprising from 50 to 75% silica; from 0.5 to 3% $Al_2O_3$; from 1 to 15% MnO; from 5 to 15% CaO; from 1 to 20% $As_2O_5$ and from 8 to 14% $Na_2O$, less than four percent of iron oxides, magnesium oxide and other oxides.

* * * * *